United States Patent
Tjora

(10) Patent No.: US 11,516,314 B2
(45) Date of Patent: Nov. 29, 2022

(54) SYSTEMS AND METHODS FOR ESTABLISHING ASYMMETRIC NETWORK COMMUNICATIONS

(71) Applicants: Disruptive Technologies Research AS, Blomsterdalen (NO); Oystein Moldsvor, Tiller (NO)

(72) Inventor: Sigve Tjora, Melhus (NO)

(73) Assignee: Disruptive Technologies Research AS

( * ) Notice: Subject to any disclaimer, the term of this patent is extended or adjusted under 35 U.S.C. 154(b) by 0 days.

(21) Appl. No.: 15/505,636

(22) PCT Filed: Aug. 24, 2015

(86) PCT No.: PCT/IB2015/001857
§ 371 (c)(1),
(2) Date: Feb. 22, 2017

(87) PCT Pub. No.: WO2016/027166
PCT Pub. Date: Feb. 25, 2016

(65) Prior Publication Data
US 2017/0279935 A1    Sep. 28, 2017

Related U.S. Application Data

(60) Provisional application No. 62/040,635, filed on Aug. 22, 2014.

(51) Int. Cl.
*H04L 29/06* (2006.01)
*H04L 69/04* (2022.01)
*H04W 52/02* (2009.01)
*H04W 28/06* (2009.01)
*H04L 1/00* (2006.01)
*H04L 9/40* (2022.01)
*H04W 88/16* (2009.01)

(52) U.S. Cl.
CPC ............ *H04L 69/04* (2013.01); *H04L 1/0061* (2013.01); *H04L 63/061* (2013.01); *H04L 63/0876* (2013.01); *H04W 28/06* (2013.01); *H04W 28/065* (2013.01); *H04W 52/0216* (2013.01); *H04W 52/0222* (2013.01); *H04W 88/16* (2013.01); *Y02D 30/70* (2020.08)

(58) Field of Classification Search
CPC ....... H04L 69/04; H04L 69/22; H04L 63/061; H04L 63/0876; H04W 52/0222; H04W 28/065
See application file for complete search history.

(56) References Cited

U.S. PATENT DOCUMENTS 7,165,112 B2   1/2007   Battin
2013/0080650 A1   3/2013   Cherian

OTHER PUBLICATIONS

Preliminary Report for related International Application No. PCT/IB2015/001857; report dated Mar. 9, 2017.

*Primary Examiner* — Jamal Javaid
(74) *Attorney, Agent, or Firm* — Onyx IP Group

(57) ABSTRACT

A method of establishing an asymmetric network between at least one node device and a gateway device is provided. The method may include transmitting a reduced data package from the node device, receiving the reduced data package in a data stream at the gateway device, validating bits of the data stream, and retrieving the reduced data package based on the validated bits.

18 Claims, 3 Drawing Sheets

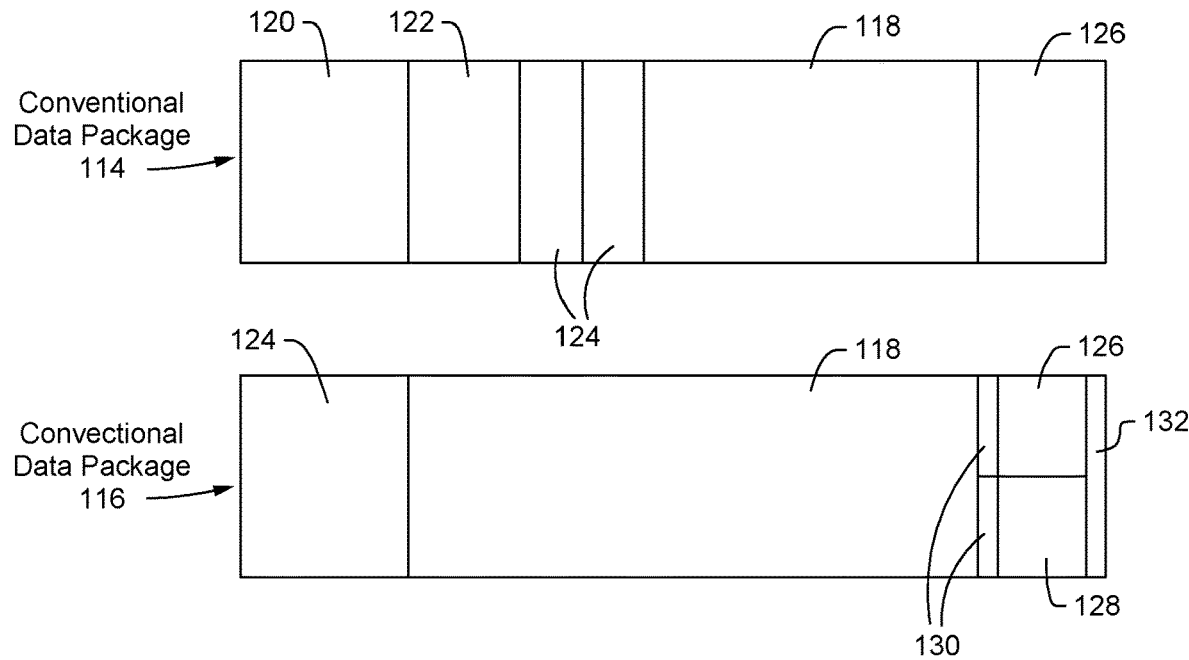
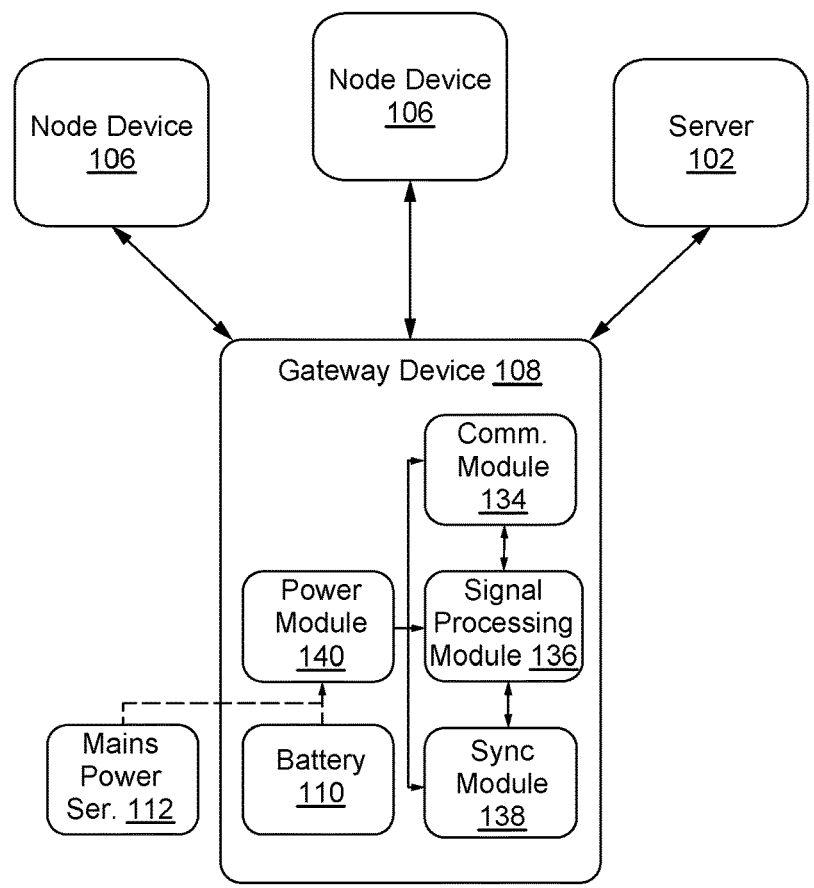
FIG.2
FIG.3

SYSTEMS AND METHODS FOR ESTABLISHING ASYMMETRIC NETWORK COMMUNICATIONS

CROSS-REFERENCE TO RELATED APPLICATION

This Application is a 35 USC § 371 U.S. National Stage filing of International Application No. PCT/IB2015/001857 filed on Aug. 24, 2015, and claims priority under the Paris Convention to U.S. Provisional Patent Application No. 62/040,635 filed on Aug. 22, 2014.

TECHNICAL FIELD

The present disclosure relates generally to network systems, and more particularly, to systems and methods for establishing asymmetric communications between network devices.

BACKGROUND

Communication networks are generally formed between one or more network devices, such as nodes, relay nodes, gateways, network servers, and the like, which communicate with one another through wired or wireless connections. For instance, nodes can communicate directly with other nodes or gateways, indirectly with other nodes or gateways via relay nodes, indirectly with network servers via gateways, or the like. In increasingly more applications, nodes are provided with embedded or sensory devices that are powered by batteries or other limited power supplies, while gateways remain powered by mains power connections or batteries with relatively higher energy storage capacities. Such asymmetries in the power availability between nodes and gateways may hint a need for similar asymmetries in the computational roles performed by nodes and gateways.

In general, power consumed by a node is directly dependent on the amount of data that is transmitted by the node, or the time-on-air, and thus, reducing the amount of time-on-air can significantly reduce the amount of power that is consumed by the given node. More particularly, a typical data package comprises the payload data, or payload bits, that are enveloped within handshake data, such as preamble bits, sync bits, control bits or header information, and cyclic redundancy check (CRC) bits. The payload is the desired content or data being transmitted, and the handshake data is the data which establishes or maintains the network connection between the node and a gateway. Reducing either the payload data or the handshake data in a transmission may reduce the overall power consumed by a node. However, conventional techniques of doing so have faced various obstacles or setbacks.

Reducing the amount of the payload data that is transmitted by a given node may reduce the size of the overall data package that is transmitted, and thereby reduce the amount of power that is consumed during the transmission. However, this solution may render each data package to be inefficient due to the disproportionately large amount of handshake data contained therein. Furthermore, additional data packages may need to be transmitted to the gateway in order to adequately convey the full payload, which, over time, may not prove to be beneficial in terms of the overall or total power consumed. Reducing the handshake data transmitted may also be problematic since conventional gateways receiving the data will likely be incapable of adequately decoding and recognizing the unconventional envelope within which the payload is encased.

In view of the foregoing setbacks and disadvantages associated with conventional network systems, a need therefore exists for an improved method or system of establishing and maintaining communications between network devices having asymmetric computational roles and corresponding asymmetric power supplies, that is not only efficient and effective, but also robust and secure.

SUMMARY OF THE DISCLOSURE

In one aspect of the present disclosure, a method of establishing an asymmetric network between at least one node device and a gateway device is provided. The method may include transmitting a reduced data package from the node device, receiving the reduced data package in a data stream at the gateway device, validating bits of the data stream, and retrieving the reduced data package based on the validated bits.

In another aspect of the present disclosure, a network system is provided. The network system may include a node device configured to transmit a reduced data package, and a gateway device configured to receive the reduced data package in a data stream, validate bits of the data stream, and retrieve the reduced data package based on the validated bits.

In yet another aspect of the present disclosure, a gateway device is provided. The gateway device may include a communication module, a signal processing module, and a sync module. The communication module may be configured to receive a reduced data package in a data stream transmitted by at least one node device. The signal processing module may be configured to process the data stream. The sync module may be configured to validate bits of the processed data stream and retrieve the reduced data package based on the validated bits.

BRIEF DESCRIPTION OF THE DRAWINGS

FIG. 2 is a diagrammatic illustration of one exemplary reduced data package as compared to a conventional data package that may be transmitted by an embedded node device to a gateway device;

FIG. 3 is a diagrammatic illustration of one exemplary gateway device that is implemented within an asymmetric network system and used in conjunction with the methods of the present disclosure.

DETAILED DESCRIPTION

Figure 1:
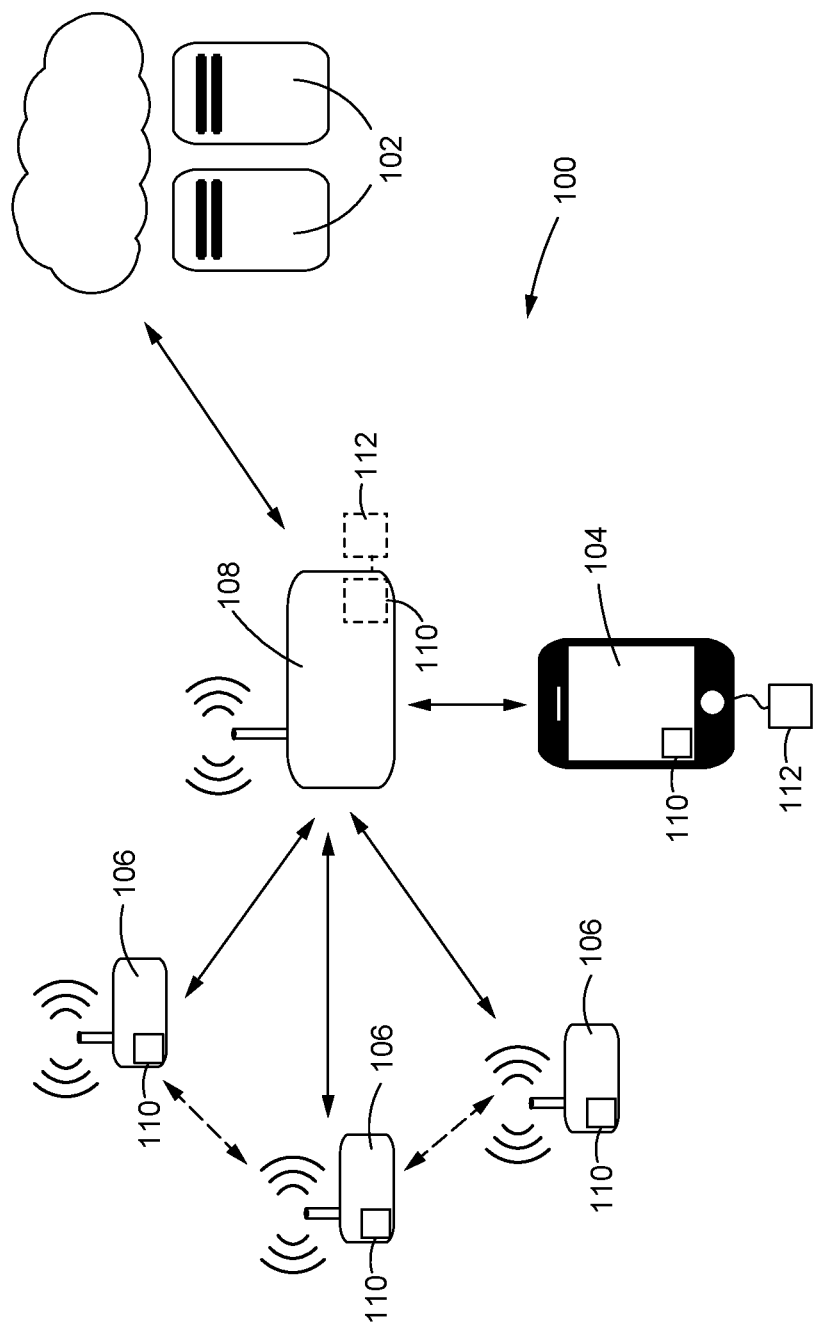
FIG. 1 is a diagrammatic illustration of one exemplary asymmetric network system that is implemented and constructed in accordance with the teachings of the present disclosure.

Referring now to FIG. 1, one exemplary embodiment of a network system 100 that may be used to establish asymmetric network communications is provided. As shown, the network system 100 may generally include one or more network servers 102, such as cloud servers, and the like, which communicate with one or more network devices, such as control devices 104, node devices 106, gateway devices 108, and the like. In other embodiments, the servers 102 may also be comprised of one or more gateway devices 108 configured to function as servers, and/or one or more local servers, such as those operating behind a firewall. More specifically, each of the network devices 104, 106, 108 may be capable of communicating directly with one another and/or directly with the servers 102 through wired and/or wireless connections. For example, each of the control devices 104 and the node devices 106 may be able to communicate directly with the server 102 and/or indirectly with the server 102 via intermediate connections using gateway devices 108, relay nodes, or the like. Furthermore, each of the network devices 104, 106, 108 may be powered by energy storage devices 110, such as batteries, and/or by connections to mains power sources 112.

Still referring to FIG. 1, each of the network devices 104, 106, 108 may represent any one of a variety of network-capable devices, and the server 102 may represent any combination of network servers commonly used in the relevant art. Control devices 104 may include, for example, smartphones, desktop or laptop computers, tablet devices, portable media players, and/or any other mobile or stationary device capable of network connectivity. In general, control devices 104 may be powered by energy storage devices 110, mains power sources 112, or a combination thereof, and thus, may or may not be largely concerned with energy consumption or efficiency. Node devices 106 may include, for example, embedded sensory nodes implementing Internet of Things (IoT) devices, or the like. Node devices 106 are typically powered by energy storage devices 110 rather than by mains power sources 112, and thus, tend to be more concerned with energy consumption and efficiency. Gateway devices 108 are generally static and connected to mains power sources 112, and thus, are not too concerned with energy consumption or efficiency.

In the particular network system 100 of FIG. 1, each of the node devices 106 may include an embedded sensing mechanism configured to detect one or more of temperature, pressure, motion, light, or any other environmental condition. Furthermore, the node devices 106 may transmit the detected conditions to the gateway device 108, which may further be communicated by the gateway device 108 to the relevant servers 102. Moreover, information from a single node device 106 may be received by a single gateway device 108, or if within the appropriate range, received by a plurality of gateway devices 108. In the latter case, the network system 100 may resolve the multiple transmissions by identifying the gateway devices 108 which communicate with the originating node device 106, or by enabling the gateway devices 108 to forward the information to the servers 102 to resolve the multiple transmissions. The network system 100 may enable, for example, gateway-to-gateway communications and/or gateway-to-server communications, or the like.

In a traditional network, the data transmitted from the node device 106 to the gateway device 108 may be enveloped within the conventional data package 114 shown in FIG. 2. As shown, the conventional data package 114 may generally be composed of payload data and handshake data. The payload data may pertain to the payload bits 118, or the content that the node device 106 is trying to convey to the gateway device 108 and ultimately to the servers 102, which in this case may correspond to environmental conditions sensed or detected by sensors within the node device 106. The handshake data may pertain to the envelope within which the payload is packaged, and may be used to maintain connectivity between the node devices 106 and the gateway devices 108.

Among other things, the handshake data in FIG. 2 may enable the gateway device 108 to not only decode the payload from the transmitted data package 114, but also to identify the node device 104 transmitting the payload. As is well known to those of ordinary skill in the art, the handshake data of a conventional data package 114 may include preamble bits 120, sync bits 122, control bits 124, address bits 126, cyclic redundancy check (CRC) bits 128, and any other information which may be required by the gateway device 108 in confirming the validity of the conventional data package 114. The preamble bits 120 and the sync bits 122 may allow the receiving gateway device 108 to lock onto the correct carrier of the transmitted signal, align its internal clock to the appropriate bits of data, and sync the gateway device 108 to acknowledge proper receipt of valid data. The control bits 124 may include header information or information pertaining to the transmit address, the receive address, and any other meta information relating to the transmission. The CRC bits 128 may enable the gateway device 108 to iteratively check for any errors or changes in the bits received.

In contrast to the conventional data package 114, the improved network system 100 of the present disclosure may be configured to transmit the modified or reduced data package 116 also shown in FIG. 2. Moreover, the present disclosure recognizes that the node devices 106 have limited power supplies, such as batteries or other energy storage devices 110, whereas the gateway devices 108 have essentially unlimited power supplies, such as via connections to mains power sources 112. Accordingly, the node devices 106 being used in the network system 100 of the present disclosure may be configured to transmit reduced data packages 116, which serve to shift or bias computational tasks and burdens away from the node devices 106 and more toward the gateway devices 108. As shown, the reduced data package 116 may include at least payload bits 118, and omit at least the preamble bits 120 and the sync bits 122 which are present in the conventional data package 114. By these omissions alone, the reduced data package 116 may enable the node device 106 to transmit a proportionately larger amount of payload bits 118 per transmission, and thereby conserve energy as well as prolong the lifetime of the battery or energy storage device 110 associated therewith. Each node device 106 may additionally negotiate between a plurality of different packet formats to transmit the reduced data package 116, where the packet formats may vary in terms of any one or more of the predetermined payload and/or packet length, packet header information, modulation, protocol support, and the like.

Other variations of the reduced data package 116 of FIG. 2 may also be possible. In one embodiment, the reduced data package 116 may include the control bits 124 to help the gateway device 108 better identify the originating node device 106. Optionally, the control bits 124 may be omitted so long as the header information is predetermined, such as during an initial network registration procedure, and so long as the relative network addresses of the node devices 106 remain static. In other modifications, the reduced data package 116 may include the CRC bits 128, or an authentication code 130, such as Message Authentication Code (MAC), Hash-based Message Authentication Code (HMAC), encryption hashes, or the like, in addition to or in place of the CRC bits 128 which may be used to identify the originating node device 106. In related modifications, address bits 126, or special forms thereof such as a sequence number, may be included in the calculation of the CRC bits 128 or the authentication code 130, which may identify the originating node device 106. More specifically, the originating node device 106 may be identified on the receiving device based on CRC, MAC and/or HMAC analyses performed, not only on the received payload, but also on any predetermined header bits, such as the address of the originating node device, message sequence number, and the like. In a cryptographic HMAC application, for example, the encryption key used to correctly verify the authenticity of the message may also identify the source of the message. Moreover, both CRC and MAC or HMAC may be employed on the same message to at least partially reduce the computational demands on the gateway device 108. In still further modifications, a set of redundant bits 132 adapted to promote more robust packet retrieval, such as via forward error correction means, or the like, may be appended to, inserted into, or otherwise integrated or associated with the reduced data package 116.

In order to offset the computational burdens lifted from the node device 106, the gateway device 108 may be configured to perform more, or other types of, computations to retrieve the transmitted payload without the preamble bits 120, the sync bits 122, and any other information that have been omitted by the reduced data package 116. One exemplary schematic of such a gateway device 108 is illustrated in FIG. 3, where each of the modular components described may be representative of hardware, software, or combinations thereof, that are configured to perform one or more functions of the gateway device 108. The gateway device 108, for example, can be preprogrammed according to one or more algorithms that may generally be categorized into at least a communication module 134, a signal processing module 136, a sync module 138, and a power module 140. While only one possible schematic of the gateway device 108 is provided, it will be understood that the gateway device 108 may additionally or alternatively be composed of other modules or other arrangements of modules capable of producing comparable results.

With reference to the gateway device 108 of FIG. 3, the communication module 134 may include antennas or other radio hardware that may be used by the gateway device 108 to interface with one or more node devices 106 and associated servers 102. More specifically, the communication module 134 may be configured to at least receive a reduced data package 116 through a data stream transmitted by one or more node devices 106 within the network system 100. The communication module 134 may also be configured to transmit information, for example, back to the originating node device 106 and any other node devices 106, or to the network servers 102. Transmissions from the gateway device 108 to a node device 106 may be performed using conventional data packages 114 as shown in FIG. 2, so as to keep the computational demands for decoding data on the node device 106 relatively simple. Transmissions from the gateway device 108 to the servers 102 may similarly employ conventional means so as to better conform to universally accepted standards. In still further modifications, transmissions from the gateway device 108 to the servers 102 may also be modified to be different from those from the node devices 106 to the gateway devices 108, such as in terms of modulation format, package format, encryption format, and the like.

The gateway device 108 of FIG. 3 may also include a signal processing module 136 and a sync module 138 configured to process the data stream received from the originating node device 106 via the communication module 134, and decode the reduced data package 116 as well as the payload bits 118 therefrom. More specifically, in order to access the reduced data package 116 from a given data stream without the aid of the preamble bits 120 and the sync bits 122, the signal processing module 136 may oversample the incoming data stream and store the oversampled data stream in a memory accessible thereto. The signal processing module 136 also rely entirely or at least partially on other signal processes, such as channel equalization, transmission pre-distortion, beam forming, multiple-input multiple-output schemes, and any other process that may increase the likelihood of successfully receiving a transmission.

If the data stream in FIG. 3 is oversampled, the sync module 138 may perform sync functions on the oversampled data stream, continuously searching for a valid CRC or an authentication code, such as a MAC, HMAC, or the like, so as to validate the appropriate bits of the oversampled data stream, and retrieve the reduced data package 116 based on the validated bits. Moreover, by performing such sync functions iteratively, the sync module 138 may be able to determine the instances at which the valid bits are temporally located, and ultimately, access and/or decode the payload bits 118 without the need for preamble bits 120 and sync bits 122. Once the payload bits 118 are retrieved, the gateway device 108 of FIG. 3 may employ the communication module 134 to communicate any acknowledgements to the originating node device 106, or to communicate any other relevant information to other node devices 106 and/or to the servers 102.

In further alternatives, the entire payload may be provided as an encrypted package, thereby enabling end-to-end encryption, and forwarded to the networks servers 102 for decryption. The integrity and authenticity of the payload may then be verified using a valid authentication code 130, such as MAC, HMAC, or the like, and the gateway device 108 may be allowed to receive the encrypted payload package and forward the payload to a network server 102 without first decrypting the payload itself. The encrypted payload may contain meta information and/or addressing information already included in the transmission from the originating node device 106, and hence remain unknown to the gateway device 108. The gateway device 108 may also append meta information, such as addressing or other information capable of identifying the originating node device 106, together with the encrypted payload when forwarding the information to the appropriate network servers 102. Such meta information may be identified by the gateway device 108 based on one or more of the methods described in the present disclosure.

Furthermore, the gateway device 108 may be provided with the power module 140 of FIG. 3, which may include a power source, such as a battery or other type of energy storage device 110, and/or a connection to a mains power source 112. In particular, the power module 140 may be configured to manage the power supplied by either an energy storage device 110 or a mains power source 112, and distribute the appropriate electrical power to each of the communication module 134, the signal processing module 136, the sync module 138, and any other components that may be provided within the gateway device 108. Although the gateway device 108 may employ different power configurations, the gateway devices 108 used in the asymmetric network systems 100 of the present disclosure may be powered by mains power sources 112, or at least batteries or energy storage devices 110 with relatively larger capacity. More specifically, because of the asymmetric distribution of computational tasks that are more heavily loaded on the side of the gateway devices 108, the power supplied to each gateway device 108 may necessarily provide at least more runtime than those of the node devices 106. Correspondingly, while a mains power source 112 can be used to supply power to the gateway device 108 without other accommodations, energy storage devices 110, such as batteries, being used to power a gateway device 108 may need to have larger capacities and/or more frequently replaced, as compared to those of the node devices 106.

Figure 4:
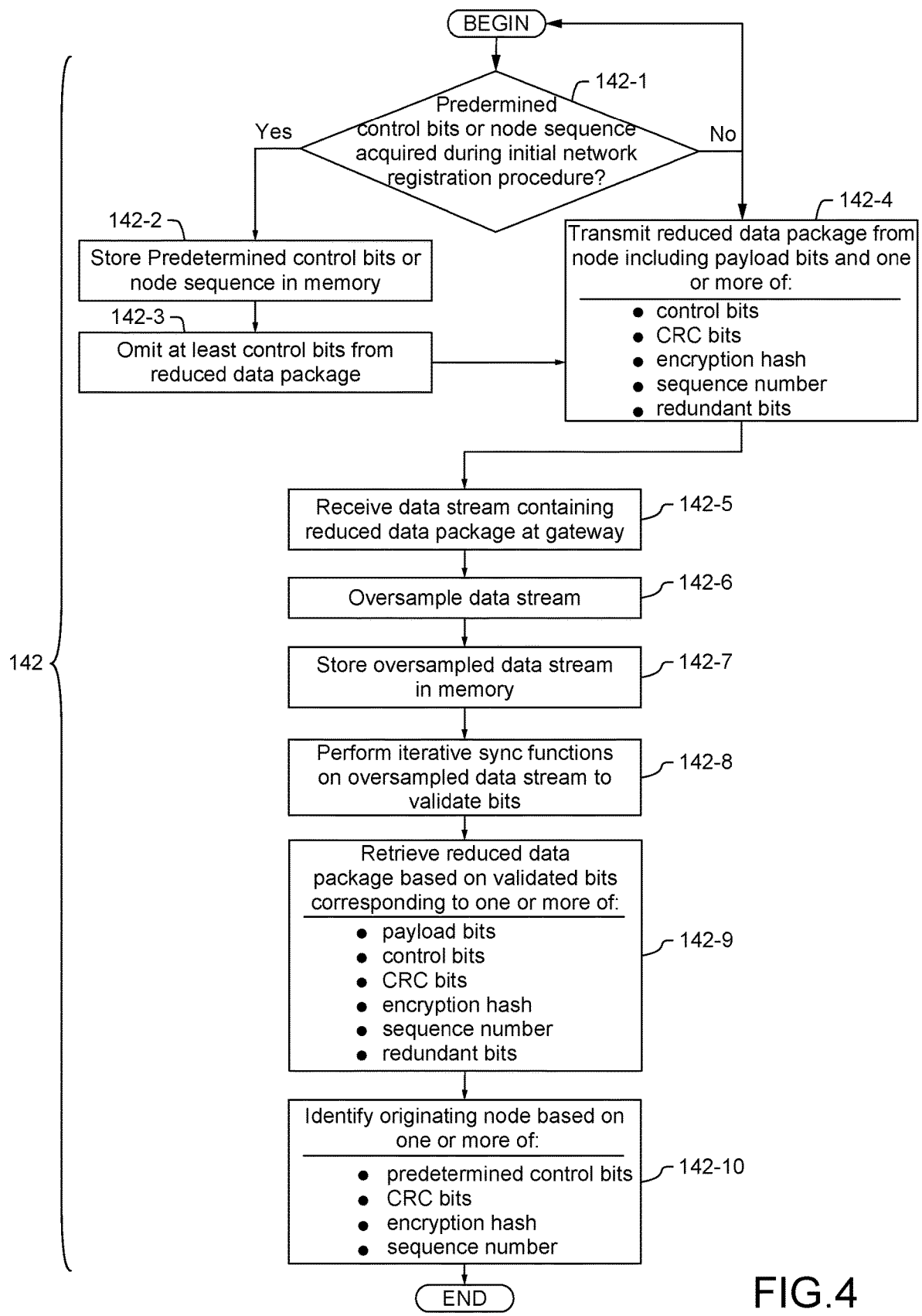
FIG. 4 is a flowchart of one exemplary method of establishing an asymmetric network that is designed in accordance with the teachings of the present disclosure.

Turning now to FIG. 4, one exemplary algorithm or controller-implemented method 142 for establishing asymmetric network communications is diagrammatically provided, according to which the network system 100, or any combination of the network devices 104, 106, 108 thereof, may be configured to operate. As shown in block 142-1, it may be relevant to initially confirm whether any control bits 124 or any address bits 126, or sequence numbers corresponding thereto, are predetermined, such as during an initial network registration procedure. More particularly, in an application where the node devices 106 have static network addresses, the corresponding control bits 124 of FIG. 2 determined during the initial registration may also remain static, and thus, may further be retrievably stored within a memory or database that is accessible to the gateway device 108 as shown in bock 142-2. Moreover, because the control bits 124 are fixed and known, the control bits 124 may be omitted from the reduced data package 116 as in block 142-3, and instead simply indexed by the gateway device 108. For example, upon receiving a reduced data package 116, the gateway device 108 may perform redundancy checks to identify the originating node device 106, and iteratively append different known control bits 124 to the reduced data package 116.

Additionally or alternatively, the method 142 in block 142-1 may similarly confirm whether any address bits 126 or sequence numbers associated with the node devices 106 are predetermined, such as during an initial network registration procedure. In contrast to the predetermined control bits 124 mentioned above, the order by which the individual node devices 106 were initially registered with the network system 100, rather than the network addresses, may be retrievably stored in a memory or database that is within or otherwise accessible by the gateway device 108 again as in block 142-2. Effectively, address bits 126, or a related sequence number, assigned to each node device 106 may correspond to the order of network registration. Thus, in an example transmission, a node device 106 may transmit a reduced data package 116 which omits control bits 124 as in block 142-3, but instead includes address bits 126 or a sequence number, such as within the CRC bits 128 or authentication code 130, as shown in FIG. 2. Upon receiving the reduced data package 116, the gateway device 108 may then iteratively scan the reduced data package 116 for the different known node sequences for matching address bits 126 or sequence numbers to identify the originating node.

As shown in block 142-4 of FIG. 4, irrespective of whether any control bits 124 or any address bits 126 are predetermined, a node device 106 of the present disclosure may still be able to transmit a reduced data package 116 which omits at least the preamble bits 120 and the sync bits 122. For example, if neither the control bits 124 nor the address bits 126 are known, the reduced data package 116 may include at least the payload bits 118 and one or more of either the CRC bits 128 or the authentication code 130, and any applicable redundant bits 132. If the control bits 124 are predetermined, the reduced data package 116 may omit the control bits 124, but include the CRC bits 128 and/or authentication code 130, and if applicable, redundant bits 132. If the address bits 126 or sequence numbers for a particular message are known, the reduced data package 116 may omit the control bits 124, but incorporate the address bits 126 or sequence numbers into the calculation of the CRC bits 128 and/or the authentication code 130, and if applicable, redundant bits 132. Depending on the specific application, other combinations of information, data and bits may be omitted or included in the reduced data package 116 to provide comparable results, so long as the reduced data package includes at least the payload bits 118 and omits at least the preamble bits 120 and the sync bits 122.

Once the reduced data package 116 has been transmitted by a node device 106, a gateway device 108 may receive a data stream containing the reduced data package 116 as in block 142-5 of FIG. 4. More specifically, as the reduced data package 116 is transmitted without the preamble bits 120 and the sync bits 122, the gateway device 108 may not be able to recognize the beginning and end of a given transmission, and thus, may resort to blindly capturing streams of data to be processed and decoded. The method 142 may further process the data stream in block 142-6. In one embodiment, the gateway device 108 may oversample the data stream, and store the oversampled data stream in a memory associated therewith. In other embodiments, other types of signal processes may be performed in block 142-6, such as channel equalization, transmission pre-distortion, beam forming, multiple-input multiple-output schemes, and any other process that may increase the likelihood of successfully receiving a transmission.

In addition, according to block 142-7 of FIG. 4, the gateway device 108 may be configured to validate bits of the data stream processed in block 142-6. If, for example, the data stream is oversampled in block 142-6, the gateway device 108 may be configured to further process the oversampled data stream in order to identify valid bit transitions, sync to the data stream, and decode and/or extract the reduced data package 116 and the relevant information contained therein. For example, iterative sync functions may be performed on time-shifted instances of the oversampled data stream to validate, identify and/or retrieve any applicable payload bits 118, control bits 124, address bits 126 or sequence numbers, CRC bits 128, authentication codes 130, redundant bits 132, and the like, as in block 142-8. While only certain techniques are described herein, other comparable signal processing schemes will be apparent to those of ordinary skill in the relevant art.

Still further, as shown in block 142-9 of FIG. 4, the gateway device 108 may be able to identify the originating node device 106 using one or more of a variety of available means. For example, where applicable, the gateway device 108 may be able to identify the originating node device 108 using control bits 124, address bits 126 or sequence numbers predetermined during an initial network registration procedure, as mentioned in blocks 142-1, 142-2, 142-3. In embodiments employing CRC bits 128, the gateway device 108 may perform the CRC routine to iteratively check several time-shifted instances of the received data stream to not only validate the retrieved bits, but also to identify the originating node device 106. Alternatively, in embodiments employing an authentication code 130 in place of CRC bits 128, the gateway device 108 may decrypt the received authentication code 130 by iteratively applying different encryption keys each having known node addresses and/or metadata. More specifically, when the authentication code 130 is successfully decrypted, the corresponding encryption key may also identify the address of the originating node device 106.

Furthermore, several instances of the method 142 of FIG. 4 may be simultaneously performed and repeated as necessary per gateway device 108 and for each data stream received. Additionally, any static information or dynamic but deterministic information including, but not limited to, node identification information, packet header information, address or sequence information, and the like, may be incorporated, integrated or otherwise associated with the calculation of the authentication codes 126 or the CRC bits 128, but excluded from the transmissions themselves. Moreover, the amount of information that can be incorporated into the authentication codes 126 or the CRC bits 128, and thereby omitted from transmissions, may vary based on the available hardware and/or the power limitations thereof.

From the foregoing, it will be appreciated that while only certain embodiments have been set forth for the purposes of illustration, other alternatives and modifications will be apparent from the above description to those skilled in the art. These and other alternatives are considered equivalents and within the spirit and scope of this disclosure and the appended claims.

What is claimed is:

1. A method of establishing an asymmetric network between at least a node device and a gateway device, the method comprising:
    transmitting a reduced data package from the node device, wherein the reduced data package includes payload bits and an authentication code, but omits at least one or more of preamble bits, sync bits, and address bits;
    receiving the reduced data package in a data stream at the gateway device;
    validating bits of the data stream;
    retrieving the reduced data package based on the validated bits: and
    identifying the node device based on one or more encryption keys associated with the node device and capable of successfully decrypting the authentication code.

2. The method of claim 1, comprising:
    oversampling the data stream;
    storing the oversampled data stream in a memory; and
    performing iterative sync functions on time-shifted instances of the oversampled data stream to validate and retrieve one or more of the payload bits and any one or more of cyclic redundancy check (CRC) bits and authentication codes contained within the reduced data package.

3. The method of claim 1, further comprising:
    acquiring predetermined control bits containing header information identifying each node device during an initial network registration procedure;
    storing the predetermined control bits in a memory associated with at least one of the gateway device and an associated server; and
    identifying the device based at least partially on the predetermined control bits and any one or more of cyclic redundancy check (CRC) bits and authentication codes contained within the reduced data package, the node device being identified based on one or more of address bits and a sequence number associated with any one or more of the CRC bits and the authentication codes.

4. The method of claim 1, further comprising:
    storing unique encryption keys for each device; and
    identifying the device based on the encryption keys which successfully decrypts an authentication code contained within the reduced data package.

5. A network system, comprising:
    a node device configured to transmit a reduced data package; and
    a gateway device, in simultaneous communication with a plurality of node devices, configured to;
        receive the reduced data package in a data stream,
        validate bits of the data stream,
        retrieve the reduced data package based on the validated bits, and
        identify the node device based on predetermined control bits acquired during an initial network registration procedure,
        the predetermined control bits being configured ot include header information identifying each of the plurality of node devices,
        the predetermined control bits being retrievably stored in a memory associated with at least one of the gateway device and an associated server.

6. The network system of claim 5, wherein the reduced data package includes control bits, payload bits and any one or more of cyclic redundancy check (CRC) bits and authentication codes, but omits at least one of preamble bits and sync bits, the gateway device being configured to oversample the data stream, store the oversampled data stream in a memory, and perform iterative sync functions on time-shifted instances of the oversampled data stream to validate and retrieve one or more of the payload bits and the CRC bits.

7. The network system of claim 5, wherein the reduced data package includes payload bits and any one or more of cyclic redundancy check (CRC) bits and authentication codes, but omits at least one of preamble bits, sync bits and control bits, the gateway device being configured to identify the node device based on the predetermined control bits and one or more of the CRC bits and the authentication codes.

8. The network system of claim 5, wherein the reduced data package includes payload bits and an authentication code, but omits at least one or more of preamble bits, sync bits, and address bits, the gateway device being configured to receive the reduced data package, identify the node device based on one or more encryption keys associated with the node device and capable of successfully decrypting the authentication code.

9. The network system of claim 8, wherein a sequence number is associated with any one or more of cyclic redundancy check (CRC) bits and authentication codes contained within the reduced data package, the gateway device being configured to identify the node device based on one or more of the address bits and the sequence number.

10. The network system of claim 5, wherein the reduced data package includes redundant bits configured to facilitate data reception by forward error correction means.

11. The network system of claim 5, wherein the node device is powered by an energy storage device and the gateway device is powered by a mains power connection.

12. The network system of claim 5, wherein the reduced data package includes at least payload bits that are provided in an encrypted payload package configured to enable end-to-end encryption.

13. A gateway device, comprising:
    a communication module configured to receive a reduced data package in a data stream transmitted by a node device;
    a signal processing module, comprising one or more prcessors, configured to process the data stream; and
    a sync module, comprising one or more processors, configured to:

validate bits of the processed data stream, and
retrieve the reduced data package based on the validated bits,
wherein one or more of address bits and a sequence number are associated with any one or more of cyclic redundancy check (CRC) bits and authentication code contained within the reduced data package, and
wherein the gateway device is configured to identify the node device based on one or more of the address bits and the sequence number.

14. The gateway device of claim 13, wherein the reduced data package includes at least payload bits, but omits at least one of preamble bits and sync bits, wherein the data stream is oversampled, and wherein the sync module is configured to perform iterative sync functions on time-shifted instances of the oversampled data stream to validate and retrieve one or more of the payload bits and any one or more of cyclic redundancy check (CRC) bits and authentication codes contained within the reduced data package.

15. The gateway device of claim 14, wherein the communication module is configured to communicate with a plurality of node devices, and the sync module is configured to identify the node device based on predetermined control bits acquired during an initial network registration process, the predetermined control bits being configured to include header information identifying each of the plurality of node devices, the predetermined control bits being retrievably stored in a memory associated with at least one of the gateway device and an associated server.

16. The gateway device of claim 13, wherein the reduced data package includes at least payload bits that are at least partially associated with redundant bits using forward error correction means configured to facilitate data reception.

17. The gateway device of claim 13, wherein the reduced data package includes payload bits and an authentication code, but omits at least one or more of preamble bits, sync bits, and address bits, the sync module being configured to receive the reduced data package, identify the node device based on one or more encryption keys associated with the node device and capable of successfully decrypting the authentication code.

18. The gateway device of claim 13, wherein the reduced data package includes at least payload bits that are provided in an encrypted payload package configured to enable end-to-end encryption.

* * * * *